C. C. ALLEN.
LENS TESTING APPARATUS.
APPLICATION FILED JUNE 7, 1916.
1,242,754.
Patented Oct. 9, 1917.
3 SHEETS—SHEET 1.
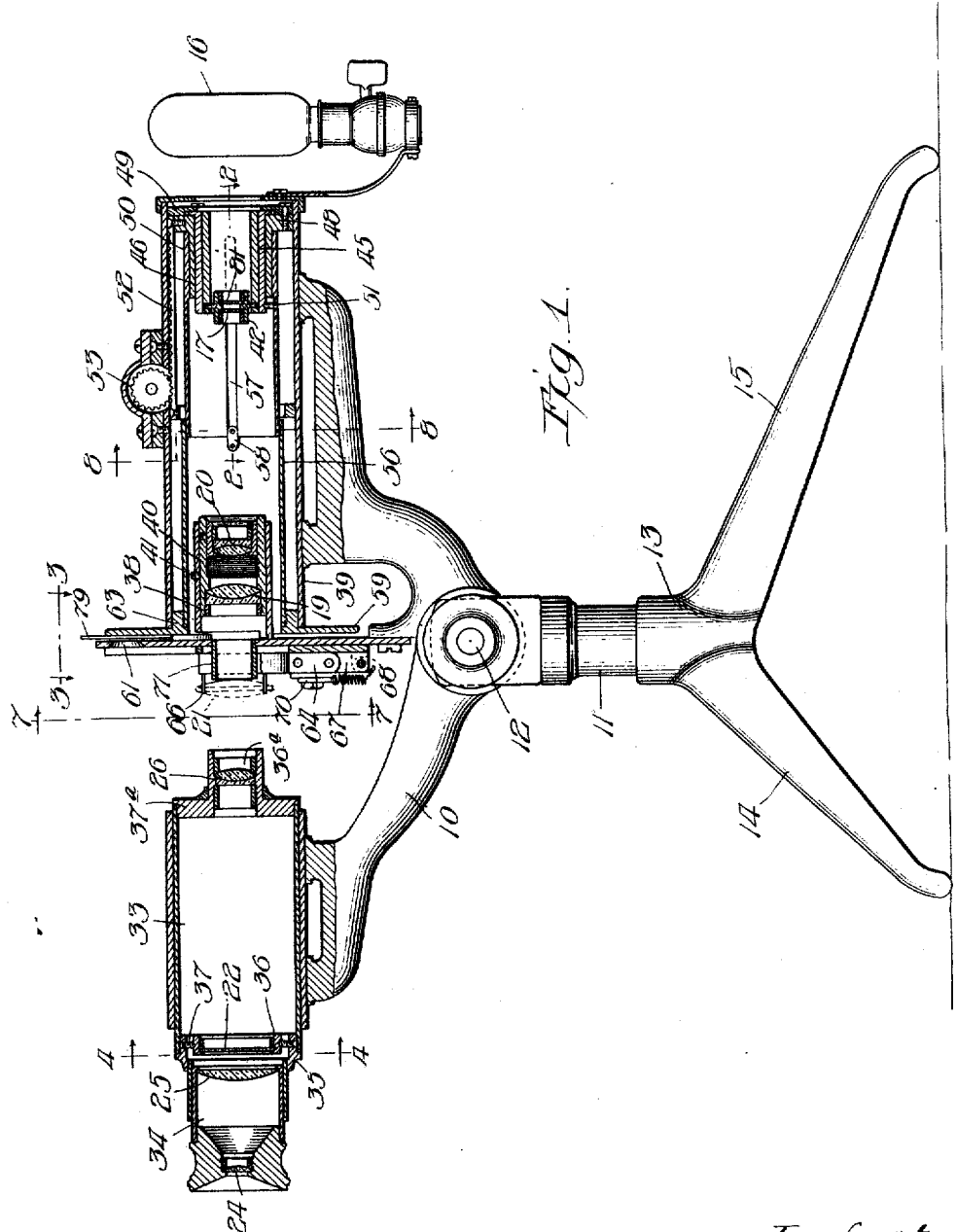
Witness:
Harry S. Gaither
Inventor:
Giles C. Allen
by Ramsey & Ramsey
Attys C. C. ALLEN.
LENS TESTING APPARATUS.
APPLICATION FILED JUNE 7, 1916.
1,242,754.
Patented Oct. 9, 1917.
3 SHEETS—SHEET 2.
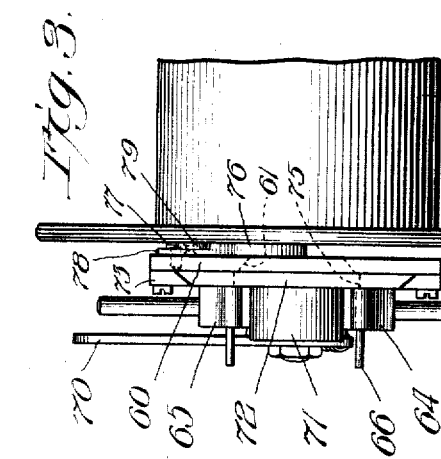
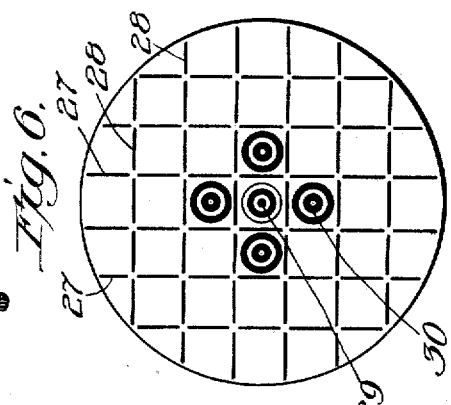
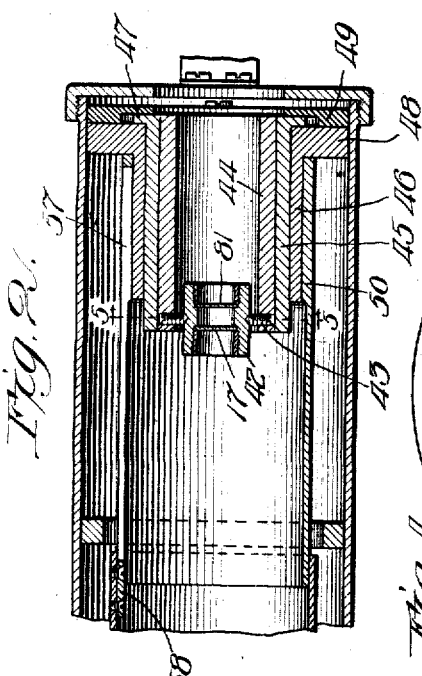
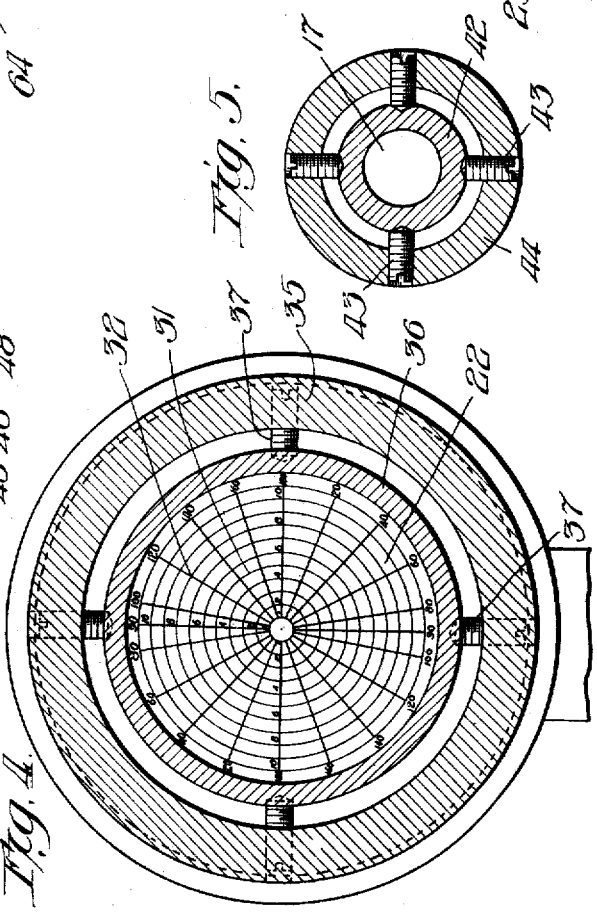
Witness:
Harry S. Gaither
Inventor:
Cole C. Allen.
by Dunning & Dunning
Attys

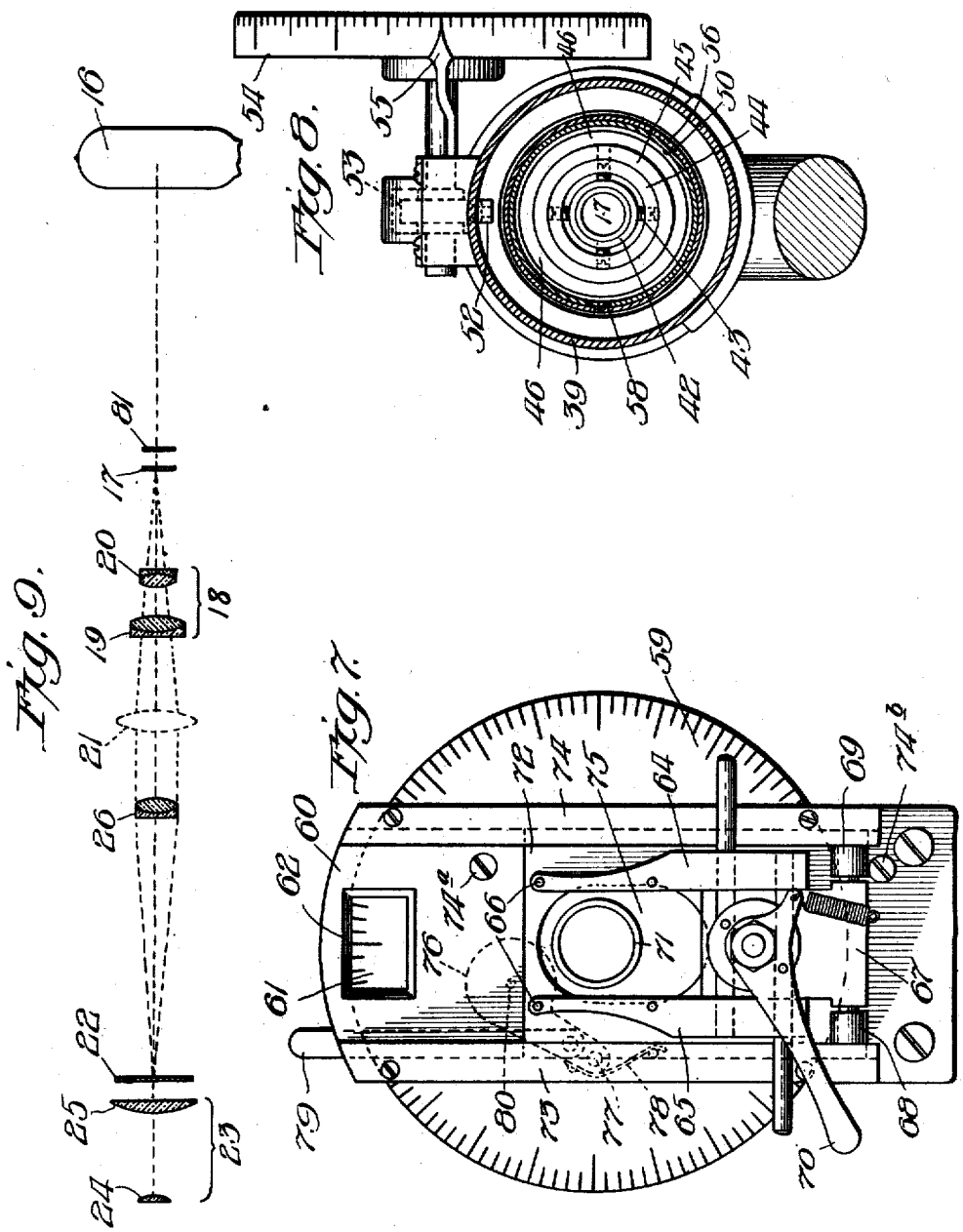

UNITED STATES PATENT OFFICE.

CLILE C. ALLEN, OF CHICAGO, ILLINOIS, ASSIGNOR TO GEORGE S. JOHNSTON CO., OF CHICAGO, ILLINOIS, A CORPORATION OF ILLINOIS.

LENS-TESTING APPARATUS.

1,242,754.  Specification of Letters Patent.  Patented Oct. 9, 1917.

Continuation of application Serial No. 68,815, filed December 27, 1915. This application filed June 7, 1916. Serial No. 102,295.

*To all whom it may concern:*

Be it known that I, CLILE C. ALLEN, a citizen of the United States, residing at Chicago, county of Cook, and State of Illinois, have invented certain new and useful Improvements in Lens-Testing Apparatus, of which the following is a specification.

The present invention relates to an instrument or apparatus, for determining the amount of prism present in ophthalmic or other lenses, and more particularly to provide means for determining the amount and axis of such prism by a direct reading of the instrument without the necessity of reference to computed tables or other compilations for that purpose, and without the necessity of any optical adjustments of the instrument.

One of the objects of the present invention is to so construct the instrument that the amount of prism and the direction of its axis may both be ascertained by a simultaneous indication on a uniformly divided or marked scale.

Still another object is to provide an instrument wherein the foregoing tests for prism may be carried out in combination with the usual focimeter tests for strength of any sphere or cylinder which may be present, as well as to the axis of any cylinder present. In this connection, another object is to so construct and associate the parts that any of the types of ophthalmic lenses ordinarily found in practice may be completely analyzed for sphere, cylinder, prism, cylinder axis and prism axis in a single series of operations without the necessity of changing the position or adjustment of the lens under test.

Other objects and uses of the invention will appear from a detailed consideration of the same, which consists in the features of construction and combinations of parts hereinafter described and claimed.

In the drawings:

Figure 1 shows a longitudinal vertical section through one form of construction embodying the features of the present invention;

Fig. 2 shows an enlarged fragmentary horizontal section taken on the line 2—2 of Fig. 1, looking in the direction of the arrows;

Fig. 3 shows an enlarged fragmentary plan view taken at the point designated by the line 3—3 of Fig. 1, looking in the direction of the arrows;

Fig. 4 shows an enlarged vertical section taken on the line 4—4 of Fig. 1, looking in the direction of the arrows;

Fig. 5 shows an enlarged vertical section taken on the line 4—4 of Fig. 1, looking in in the direction of the arrows;

Fig. 6 shows a greatly enlarged elevation of a convenient form of test object for ascertaining deviation which may be occasioned by the presence of any prism;

Fig. 7 shows an enlarged front elevation of the rear portion of the instrument, being a view on the line 7—7 of Fig. 1, looking in the direction of the arrows;

Fig. 8 shows an enlarged horizontal section taken on the line 8—8 of Fig. 1, looking in the direction of the arrows; and Fig. 9 shows diagrammatically the relative positions of the principal optical elements of the construction illustrated in the several figures, and it also shows by broken lines a typical path of travel of light rays passing through the system when said system is in balance.

One of the objects of the present invention is to provide means for quickly and accurately ascertaining the amount and axis of a prism present in ophthalmic or other lenses either in combination with a focimeter or independently thereof, and, in order that the principles of invention herein may be more readily appreciated and understood, I will first outline briefly the underlying features involved in the testing of lenses.

Ophthalmic lenses may contain the characteristics of a sphere, a cylinder, and a prism either singly or in combination, and in the testing or inspection of such lenses it is necessary to ascertain the amount or power of such sphere, cylinder, or prism, as may be contained in the lens being tested, and also the axes of said cylinder and prism.

In order to ascertain these several properties of a lens under test, the combination of my present invention for testing the prism value and axis, with a focimeter of the type shown in my co-pending application, Serial No. 853,213, filed July 25, 1914, for ascertaining the powers of sphere and cylinder and the cylinder axis, forms an ideal instrument for ascertaining all of the properties of a tested lens at one positioning or setting of the lens in the instrument.

In the above mentioned type of focimeter, an image screen may be used to ascertain when the rays of light have been brought to a definite condition, namely, to focus, and any suitable means may be provided for observing the image screen to ascertain when the rays have been brought to focus thereon. In order, however, to have knowledge of the presence of this condition, there must be an object in the path of travel of the rays, the image of which object will be brought to focus on the image screen. Such an object may be any suitable marking on a test object. If a lens system or any equivalent lens of known characteristics be interposed between the test object and the lens under test, then as the test object is approached toward or moved from said lens system, the rays of light proceeding from the lens system will be either increased or decreased in dioptric power, according to such movements. If the lens to be tested be placed at the principal focus of the lens system, then at such point the variation of dioptric power of the rays of light coming from the lens system will be uniform for uniform amounts of movement of the test object. This principle is known as the Nagel formula. By placing the image screen at such point that the rays of light will be brought to focus on the same when there is no tested lens interposed between the lens system and the image screen, a definite point for the test object is located which I shall designate the zero point. Then a scale may be provided, measuring in either direction from said zero point and showing by its uniform divisions the variation of dioptric power of rays of light at the position of the principal focus of the lens system corresponding to uniform divisions of said scale.

If the test object be set at zero, so as to bring its image to focus on the image screen, and then the lens to be tested be interposed at the position of the principal focus of the lens system, then the rays of light leaving the lens to be tested will be so altered as to no longer come to focus at the image screen. If the tested lens be of plus character, the rays of light will be brought to focus in advance of the image screen, whereas if the lens to be tested be of minus character, said rays will either come to focus behind the image screen, or be so divergent as not to come to focus at all. In the former case, if the test object be moved toward the lens system, so as to cause a divergence of the rays at the tested lens equal in power to the convergence occasioned by the lens to be tested, then the rays will again be brought to focus at the image screen, and the image will be clearly observed thereon. In the second case, if the test object be moved away from the lens system a sufficient distance to cause a convergence of rays at the tested lens equal in power to the divergence occasioned by the lens to be tested, then said rays will again be brought to focus at the image screen, and the image will again be clearly observed thereon.

In either of the above mentioned cases, the amount of movement of the test object will be an approximate measure of the dioptric power necessary to neutralize the lens under test, and, therefore, will be an approximate measure of the strength of the lens under test. The separation of the nodal points of the lens under test will affect the accuracy of such measurements, unless the rays of light will emanate parallel from the lens under test at the instant of neutralization. In case the arrangement be such that the rays emanate parallel from the lens under test, the position of the second nodal point of the lens under test may be disregarded, and, therefore, any error occasioned by its position will be eliminated. This feature is fully shown and described in my co-pending application for Letters Patent of the United States for improvements in lens testing apparatus, Serial No. 853,213, which was filed July 25, 1914.

In case there be a prism present in the lens under test, the presence thereof will cause a decentration or deflection of the image of the test object away from the center of the image screen in a direction dependent upon the direction of the prism axis, and in amount depending upon the degree of the prism. It can be shown that the amount of deviation away from that position which the image would normally occupy on the image screen with no prism present will be directly proportioned to the value or degree of the prism actually present, so that the amount of deviation at the image screen will vary directly with the degree of any prism present. This is also true when the system is operating according to the principle of parallel rays emerging from the lens under test, wherein a telescope objective is located its principal focal length from said image screen and between said image screen and the tested lens.

In case there be a cylinder in the lens, the value thereof can be ascertained as the difference between the two positions of the test object at which rays of light along the axis of the cylinder come to focus, as compared to the position of the test object to bring rays of light at right angles to the axis of the cylinder, to focus.

Referring now to the arrangement shown in the several figures, I will state that I have therein shown a construction operating according to the principle of parallel rays; but I wish it to be distinctly understood that I do not limit myself to the use of the invention on the parallel rays principle.

Referring now to the several figures, the operative parts of the instrument are conveniently carried by a bracket 10 pivoted to a standard 11 at the point 12, so that said bracket can be swung about a horizontal axis. The standard 11 is carried by a tri-pod 13, having a pair of front legs 14 (only one of said legs showing in Fig. 1) and a back leg 15.

Before proceeding further with the description of the mechanical construction of the instrument, I will describe the diagrammatic arrangement shown in Fig. 9. In the arrangement shown in that figure, the light emanating from a suitable source, such as an electric lamp 16 illuminates a test object 17 and passes through said test object to a lens system 18. Said lens system is shown as comprising the lens elements 19 and 20, which together serve to cause the rays emanating from a point on the test object to emerge parallel from the lens system 18 and, therefore, be parallel at the position of the lens to be tested, 21, when the test object stands at the zero position.

The image screen is designated by the numeral 22, and the image upon its surface is conveniently observed by an eye piece 23 comprising the lenses 24 and 25. Said lenses, comprising an eye piece, simply serve to magnify the image on the image screen, so that the same can be more conveniently observed.

Upon shifting the test object to the proper position, the refractive effect of the lens under test 21 will be approximately neutralized, so that the rays will again come to an approximate focus on the image screen 22 where they can be observed. When the system is operating according to the principle of parallel rays, it may be made to include a telescope objective 26 placed its principal focal distance from the diagram screen 22, so that the parallel rays of light striking said telescope objective will be brought to focus on the image screen. The position of the lens to be tested 21 is preferably at the principal focal point of the lens system 18, so that the markings on the scale will be uniform according to the Nagel formula.

Reference to Fig. 6 shows in enlarged detail a convenient system of markings on the test object. The screen there shown includes sets of broken lines 27 and 28 lying at right angles to each other, so that when the one or the other of said sets is brought into focus and lies parallel to the axis of a cylinder in the lens under test, said set of lines will appear clear and distinct, whereas the set at right angles thereto will be blurred or invisible. The test object also includes a sharp marking of some kind indicating the optic axis, so that when the system is brought into balance, the image of said marking will be brought to focus on the image screen. If the lens under test contains a prism, said mark will be deflected away from the center of the image screen according to the principle hereinbefore mentioned. A convenient system of markings is that shown in Fig. 6, the same including a central dot and a plurality of concentric rings 29, the dot standing at the position of the optic axis. In order to emphasize the position of this dot and rings, similar sets 30 may also be formed at positions surrounding the same.

Reference to Fig. 4 shows in enlarged detail a convenient form of image screen for ascertaining the amount and direction of the deviation occasioned by the prism. This image screen includes a plurality of concentric rings 31 uniformly spaced from the optical center of the image screen, said rings being so positioned as to indicate successive prism values. As previously explained, the amount of deviation for uniform variations of prism value will be uniform, and, therefore, the rings 31 are preferably uniformly spaced. If no prism be present in the lens, the image of the dot and circles 29 will be seen to be accurately centered on the image screen, whereas the presence of a prism will cause a deviation outwardly in a given direction, the amount of which deviation can be immediately ascertained by observing the values of the rings between which the image of the dot is formed. In order to ascertain the direction of the prism axis, a plurality of radial lines 32 may be provided on the image screen, and suitable degree markings may be placed on these radial lines, so that the operator can immediately ascertain the exact direction of the prism axis.

Referring again to Fig. 1 and the various detail figures, the image screen, eye piece, and telescope objective (when operating according to the system of parallel rays) are conveniently carried by a telescope tube 33. The eye piece lenses 24 and 25 are conveniently mounted in a tube 34 which slides within a thimble 35 secured to the end of the tube 33. The image screen is conveniently mounted within a ring 36, which ring is supported from the thimble 35 by a plurality of centering screws or the like 37, so that the image screen may be accurately centered with respect to the optic axis. When the system operates according to the principle of parallel rays, the telescope objective 26 may be conveniently mounted within a sleeve 36ª threaded into a cap 37ª in one end of the tube 33. It can be accurately adjusted back and forth with respect to the image screen so as to bring the second nodal point of the telescope objective its principal focal distance from the image screen. The lens system 18 is conveniently carried by a tube 40 which projects into the forward portion of a stationary tube 39.

Said stationary tube in turn is connected to the rear arm of the bracket 10.

In the particular construction of lens system illustrated, the lens elements 19 and 20 are carried within a sleeve 40 which is slidably mounted in the sleeve 38 and can be locked into different set positions by means of a set-screw 41. In this manner, the lens system can be accurately positioned with respect to the portion of the lens to be tested and with respect to the scale readings of the instrument.

The test object 17 is conveniently mounted within a sleeve 42, which sleeve may be accurately centered with respect to the optic axis by means of the set screws 43. Said set-screws in turn are carried by a sleeve 44 which seats snugly within the sleeve 45. The sleeve 44 may upon occasion be moved back and forth, or turned within the sleeve 45, but during the ordinary operation of the instrument, these parts operate as a unit, traveling longitudinally, or rotating together.

The sleeve 45 is rotatably mounted within a sleeve 46, but axial movement of the sleeve 46 carries with it the sleeve 45. In order to secure such axial movement, the sleeve 45 has the flange 47 seating against the collar 48 of the sleeve 46, and the recessed collar 49, fastened to the collar 48, holds the flange 47 thereagainst. The sleeve 46 is mounted within a sleeve 50, and the sleeve 50 in turn is free to rotate on the sleeve 46. A set-screw 51 joins together the sleeves 45 and 50 without connecting them to the sleeve 46, so that the sleeves so joined together may rotate in unison while the sleeve 46 remains stationary.

The flange 48 has connected to it a rack bar 52, which rack bar clears the inner surface of the tube 39. A slotted opening is formed in the upper portion of the tube 39 to receive a pinion 53, which pinion is connected to the graduated wheel 54 conveniently located at one side of the instrument. Rotation of the wheel 54 drives the rack bar back and forth, and likewise carries the sleeves 44, 45, 46, and 50 back and forth. It, therefore, follows that the position of the diagram screen can be accurately adjusted by turning the graduated wheel in one direction, or the other. The markings on the graduated wheel may be so graduated as to indicate variations of the strength of the light as measured in diopters or any other convenient units of measurement. A pointer 55 serves to indicate the particular position of the diagram screen at any given instant. The sleeve 50 is slidingly mounted within another sleeve or tube 56, but the tubes 50 and 56 are compelled to rotate together. For this purpose, the sleeve 50 has an elongated slot 57, within which works a block 58 mounted on the inner surface of the sleeve 56. The rack bar previously described works in the space between the sleeve 56 and the stationary tube 39.

The front end of the sleeve 56 is connected to a disk 59, whereby it may be rotated. The front face of the disk 59 is graduated according to the degrees of a circle, so that the operator can conveniently observe the angular position of the sleeve 56 at any instant. This will give him likewise an indication as to the angular position of the test object. The disk 59 conveniently rotates behind an upright plate 60, wherein is formed an opening 61 having a mark 62 on one of its edges. This mark indicates the axis position, and the scale readings from the disk 59 are taken with respect thereto. As a convenient form of construction, the disk 59 is provided with a collar 63 working freely on the inside of the tube 39 and serving to accurately center the disk and the sleeve 56.

The lens to be tested may be supported at the principal focal point of the lens system, so that its geometric center coincides with the optic axis in any convenient manner. However, for this purpose, a desirable construction is one which includes the clamping jaws 64 and 65, each of which is provided with a pin 66. Said jaws are slidingly mounted with respect to a common block 67, said block in turn being pivoted between the lugs 68 and 69. A lever 70 is so connected to the bars 64 and 65 that the movement of said lever in either direction causes the bars to recede from and approach toward each other, and thus center the lens on the pins 66. Protruding from the upright plate 60 is a thimble 71, the outer edge of which is located at the proper distance from the lens system to properly position the lens to be tested. The lugs 68 and 69 are mounted on a plate 72, which in turn is slidable with respect to the upright plate 60, and is connected to said upright plate by the side bars 73 and 74. By raising the plate 72 the tested lens can be raised when it is desired to raise said lens for the purpose of testing the lower or reading area when the tested lens is a bifocal. The amount of rise or fall of this plate 72 is limited by the stops 74$^a$ and 74$^b$. The thimble 71 extends through an elongated slot 75 in the plate 72, so as to permit the aforementioned movement of the plate. By reason of the pivotal mounting of the block 67 between the lugs 68 and 69, the bars 64 and 65 may be swung forward and downward at any time in order to place a lens whose edge is unfinished (uncut) upon the thimble for testing.

It will be seen from the foregoing description that when there is a cylinder in the lens to be tested, but one of the principal meridians of the lens can be focused on the image screen at one time, the meridian not focused being blurred and generally invisible. That is to say, when one set of the parallel interrupted straight lines, say 27, is brought to focus, the opposite set of lines 28 will be blurred or invisible. The lines in focus 27 will also be distorted in the direction of their length, so that their images will appear as a series of straight unbroken lines. This distortion will also be present in the image of the central area 29 which will appear as a blurred and elongated streak. This renders it impossible to definitely locate the position of the center of the image 29 of the test object 17 upon the image screen 22 for ascertaining the amount and axis of a prism contained in the tested lens. This difference in clearness of image in the two principal meridians of the tested lens is quite advantageous when testing the power of lenses which contain cylinders, and especially so when testing cylinders of low power. For this reason, the lens system is so constructed as to possess a relatively large aperture, usually F/3 to F/4. This large aperture, however, renders it quite impossible to definitely locate upon the image screen the image of a definite part 29 of the plane test object, for the purpose of measuring the amount of deviation, due to prism present in a tested lens which contains other than a cylinder of very low power, because of the diffusion of focus at the plane of the image screen of all but one principal meridian of the tested lens.

As a large proportion of ophthalmic lenses contains cylinders, some means must be provided of definitely locating the central portion 29 of the test object 17 at the plane of the image screen 22. This I have provided in the plate 76, containing the small aperture 80, which is swingingly attached to the back of the plate 60 at the pivotal point 77. By applying pressure upon the exposed end of the bar 79, the plate 76 will be forced downward until the small aperture 80 lies centrically upon the optic axis. A spring 78 tends to return the plate 76 to its original position when said pressure is removed. This great reduction of aperture, due to the small aperture 80, practically eliminates refraction due to the curvature of lens surfaces, but does not eliminate refraction due to lack of parallelism between the planes of the surfaces of the tested lens (prism). The image is, therefore, formed by the "pin-hole" 80 independently of any focal action of the lenses 19, 20, and 26, and, in fact, these lenses may be removed from the instrument without, in any way, affecting the accuracy of the prism test. In practice, I prefer to assign to the aperture 80 sufficient diameter that a visible image of the central area 29 may be formed at the image screen 22 when employing an illuminant 16, such as may be readily secured in the usual trade channels.

Inasmuch as the prism image is formed by the "pin-hole" method, it will be readily seen that the accuracy of this test is not affected by a displacement of the test object 17, along the optic axis, from its correct position when testing the power of this tested lens.

The advantages derived from the form of the test object 17, as shown, will be readily apparent, as the image of the central portion 29 will appear dark at the image screen 22, while the outer portion containing the lines 27 and 28 will serve to illuminate the entire field of the image screen 22, thereby rendering the markings and figures thereon visible to the operator. The lens 26 placed its focal distance from the image screen 22 is necessary in securing parallel emergences of light from the lens under test, as hereinbefore described. This lens 26 is also useful, when placed its focal length from said image screen 22, for increasing the capacity of the instrument in the measurement of prism diopters when using an image screen of given size. This result follows by reason of the fact that when said lens 26 is used, the concentric rings 31 must be placed closer together for given intervals of prism diopters than when said lens 26 is not used.

The "pin-hole" 80 may be of any size desired for accomplishing the result sought. I will, however, state that a convenient size is one from F/50 to F/200, when the aperture of the lens system ranges from F/3 to F/4. It will also be observed that, by the use of the "pin-hole" construction above described, a pencil of rays may be selected from the central portion of the beam of light, and the deviation of said pencil is indicated both as to direction and amount on the image screen, said pencil being the central pencil of rays coming from the test object.

The positioning of the aperture 80 upon the optic axis, as hereinbefore described, eliminates diffusion of the image of the object 20 due to the difference of curvature in different meridians of the tested lens by reason of the presence of a cylinder. This positioning of the aperture 80 does not, however, appreciably reduce effects due to chromatic aberration. Where the tested lens contains a prism of other than low power chromatic aberration will be evidenced by a radial diffusion of the image of the object 29, which renders the exact location of this image of the object 29 upon the screen 22 difficult. This diffusion of image, by reason of chromatic aberration, I eliminate by a color screen 81 which transmits light corresponding to the required range of wave lengths and absorbs all others. This screen may be of any practically pure color range, although a range permitting the greatest luminosity is preferable. For example a suitable screen would be one which transmits wave lengths corresponding to the orange region of the spectrum which would, of course, transmit orange rays and absorb light waves corresponding to all other colors than orange. In order to reduce the chromatic aberration to a minimum amount, the range of wave lengths transmitted should be made as small as possible. On the other hand the reduction of the range of wave lengths, cuts down the amount of luminosity transmitted, so that if the range be made too small, satisfactory illumination of the scale on the screen 22 will not be secured. I have found, as one example, that a range of wave lengths from 5900 A. u. to 6300 A. u. will reduce the chromatic aberration a sufficient amount to give accurate indications on the scale 22, while at the same time sufficiently illuminating said scale to enable the operator to clearly observe the image. I may state that substantially mono-chromatic light will give satisfactory results in operation.

In addition to the advantages derived from the use of this screen 81 in testing prisms, other advantages are obtained. The lens doublets 19, 20, and 26 may be constructed as simple lenses of appropriate curvature which constitutes a simplification of the lens system of the instrument, and a consequent economy in manufacture. It will be seen that this color screen eliminates chromatic aberration of all refracting elements of the apparatus including the tested lens. While I have shown the color screen 81 as located between the test object and illuminant, and adjacent to said test object, I do not limit myself to this location as it is obvious that said color screen may be located at any convenient position between the illuminant and the eye of the operator.

This application, as to certain features disclosed herein, is a continuation of my application, Serial No. 68,815, which was filed December 27, 1915.

I claim:

1. In a lens testing apparatus, the combination of a test object having thereon a mark designating the optic axis of the system, an image screen, said image screen being provided with a plurality of equally spaced concentric circles designated according to equal variations of prism diopters, and being further provided with a plurality of radial degree markings, said circles and said radial markings being centered with respect to the optic axis, means for supporting a lens to be tested between the test object and the image screen, and means for eliminating at a position between the test object and the lens to be tested, all of the rays of light coming from the test object with the exception of rays intercepting or traveling along the optic axis of the system at the position of said eliminating means.

2. In a lens testing apparatus, the combination of a test object having thereon appropriate marks designating the optic axis, an image screen having thereon a plurality of circles designating prism diopters, and being further provided with means for indicating the direction of the prism axis, means for supporting a lens to be tested between the test object and the image screen, and means for eliminating all the rays of light traveling between the test object and the lens to be tested, with the exception of a cone of rays having its apex at the position of said eliminating means.

3. In a lens testing apparatus, the combination of a test object having thereon a suitable designation indicating the position of the optic axis, an image screen having thereon a plurality of concentric circles drawn about the optic axis and indicating prism diopters, means for indicating the direction of the prism axis, means for supporting a lens to be tested between the test object and the image screen, and means for selecting, at a point in advance of the lens to be tested the pencil of rays coming from said designation on the test object and traveling on the optic axis.

4. In a lens testing apparatus, the combination of a test object suitably formed to designate the optic axis, an image screen having thereon concentric circles drawn about the optic axis and indicating prism diopters, means for ascertaining the direction of the prism axis, means for supporting a lens to be tested at a point between the test object and the image screen, and means located between the test object and the lens to be tested for designating the pencil of rays emanating from the point of intersection of the optic axis with said test object.

5. In a lens testing apparatus, the combination of a test object suitably formed to designate the optic axis, an image screen, means for supporting a lens to be tested at a point between the test object and the image screen, and means for designating, at a position between the test object and the lens under test, the axial rays, means for ascertaining on the image screen the position of the image of the test object formed by said axial rays.

6. In a lens testing apparatus, the combination of an image screen, means for supporting a lens to be tested in advance of the image screen, means for forming a cone of rays radiating from a point on the optic axis in advance of the lens to be tested, means for selecting from said cone of rays, the axial rays of said cone at a point in advance of the lens to be tested, and means for designating on the image screen the position of the image formed by said axial rays with respect to the optic axis.

7. In a lens testing apparatus, the combination of an image screen, means for supporting a lens to be tested in advance of the image screen, a pair of separated elements in advance of the lens to be tested, each being suitably formed to designate the position of the pencil of rays concentric with the optic axis, and means for indicating on the image screen the direction of the image formed by said pencil of rays with respect to the optic axis, and for designating on the image screen the distance of the said image from the optic axis.

8. In a lens testing apparatus, the combination of a test object having thereon a suitable marking designating the position of the optic axis, an image screen having thereon a plurality of concentric circles drawn about the optic axis and indicating prism diopters, and also having thereon a plurality of radial lines designating direction of prism axis, means for supporting a lens to be tested at a point between the test object and the image screen, and means located between the test object and the lens under test for limiting rays radiant from said suitable marking of the test object to a pencil of rays incident at the center of the lens under test.

9. In a lens testing apparatus, the combination of a test object having thereon a suitable marking designating the position of the optic axis, an image screen, means for indicating on said screen the position of the image of that portion of the test object lying on the optic axis, means for supporting a lens to be tested at a point between the image screen and the test object, and means for forming said image by axial rays radiant from that portion of the test object aforesaid.

10. In a lens testing apparatus, the combination with a positive lens and an illuminated diagram, of means for varying the optical power of rays of light radiant from said illuminated diagram incident upon a lens under test, to thereby compensate for the optical power of said lens under test, by causing the rays of light to enter said positive lens parallel, an image screen placed at the principal focus of said positive lens, means on the illuminated diagram for indicating the position of the optic axis, means on the image screen for indicating in terms of prism diopters and degrees the amount of prism and the direction of prism axis, and means located between said illuminated diagram and the position of said lens under test for eliminating all of the rays of light except those intersecting or traveling along the optic axis at the position of said elminating means.

11. In a lens testing apparatus, the combination with a positive lens and means for viewing an image formed at its principal focus, and an illuminated diagram, of a support for a lens to be tested between said positive lens and illuminated diagram, a positive lens between the lens to be tested and the illuminated diagram, means for varying the separation between the illuminated diagram and the last mentioned positive lens for the purpose of varying the optical power of light incident upon the lens under test, to thereby bring the rays delivered from said lens under test to the first mentioned positive lens into parallelism, means for designating on the illuminated diagram the position of the optic axis, means for indicating on the viewing means the extent and direction of deviation of the image of said portion of the illuminated diagram, and means between the illuminated diagram and the position of the tested lens for causing the formation of said image by practically axial rays.

12. In a lens testing apparatus, a lens, a translucent screen placed at the principal focus of said lens, a lens system facing said lens, a diagram, means for moving said diagram relative to said lens system, means for holding the lens under test between said lens and said lens system, means for illuminating said diagram, means for viewing the image of said diagram formed on said translucent screen, a mark on said diagram designating the position of the optic axis, means on the translucent screen for designating the amount and direction of deviation of said pencil of rays from the optic axis, and means for forming on the translucent screen an image of said mark by the use of practically axial rays.

13. In a lens testing apparatus, the combination of a positive lens and a positive lens system, said lens system including a lens under test, an object, said object being so related to said lens system that when the object is placed at the principal focus of said lens system its image will be formed at the principal focus of said lens, and means for viewing said image, the position of the plane of the principal focus of said lens system being a measure of the optical power of the lens under test, means on said object for designating the position of the optic axis, means on said viewing means for designating the amount and direction of deviation of the image of said designating means from the optic axis, and means for forming on said viewing means said image by the use of practically axial rays.

14. In a lens testing apparatus, the combination of an image screen, means for supporting a lens to be tested in advance of the image screen, means for designating the origin of rays traveling on the optic axis in advance of the lens to be tested, means for selecting a pencil of said rays at a point also in advance of the lens to be tested, means for designating on the image screen the position and direction of impingement of said pencil of rays with respect to the optic axis, and means for eliminating chromatic aberration of the lens to be tested.

15. In a lens testing apparatus, the combination of an image screen, means for supporting a lens to be tested in advance of the image screen, means for designating a pencil of rays traveling on the optic axis in advance of the lens to be tested, means for selecting said pencil of rays at a point in advance of the lens to be tested, means for designating on the image screen the position and direction of the image formed by said pencil of rays with respect to the optic axis, and means for eliminating chromatic aberration of the refracting elements of the apparatus.

16. In a lens testing apparatus, the combination of an image screen, means for supporting a lens to be tested in advance of the image screen, means for designating the point of origin of a pencil of rays traveling on the optic axis, means for designating on the image screen the position and direction of the image formed by said pencil of rays with respect to the optic axis, and means for selecting said pencil of rays at a point between the lens under test and the point of origin of said pencil, for forming said image.

17. In a lens testing apparatus, the combination of an image screen, means for supporting a lens to be tested in advance of the image screen, means for limiting rays originating on the optic axis in advance of the lens to be tested to a pencil of axial rays, means for designating on the image screen the position and direction of the image formed by said pencil of rays with respect to the optic axis, and means for eliminating chromatic aberration of the tested lens.

18. In a lens testing apparatus, the combination of an image screen, means for supporting a lens to be tested in advance of the image screen, means for selecting a pencil of rays traveling on the optic axis, means for designating on the image screen the position and direction of the image formed by said pencil of rays with respect to the optic axis, and means for forming said image by the use of monochromatic light.

19. In a lens testing apparatus, the combination of an image screen, an object, means for supporting a lens to be tested at a point between the object and the image screen, and means for forming on the image screen the image of the object by the use of monochromatic light.

20. In a lens testing apparatus, the combination of an image screen, an object, a lens system between the object and the image screen, and means for forming on the image screen the image of the object by the use of monochromatic light.

21. In a lens testing apparatus, the combination of an image screen, an object, means for supporting a lens to be tested at a point between the object and the image screen, and means for forming on the image screen the image of the object by light of desired range of wave lengths.

22. In a lens testing apparatus, the combination of an image screen, an object, means for supporting a lens to be tested at a point between the object and the image screen, and means for eliminating at a point in advance of the eye of the operator all wave lengths of light not lying within a desired range of wave lengths.

CLILE C. ALLEN.

Witnesses:
THOMAS A. BANNING, Jr.,
FRANCES M. FROST.

Copies of this patent may be obtained for five cents each, by addressing the "Commissioner of Patents, Washington, D. C."